US007016040B2

(12) United States Patent
Chen et al.

(10) Patent No.: US 7,016,040 B2
(45) Date of Patent: Mar. 21, 2006

(54) IMAGING POLARIMETER SENSOR WITH ACHROMATIC BEAM-SPLITTING POLARIZER

(75) Inventors: Chungte W. Chen, Irvine, CA (US); David A. Ansley, Long Beach, CA (US)

(73) Assignee: Raytheon Company, Waltham, MA (US)

( * ) Notice: Subject to any disclaimer, the term of this patent is extended or adjusted under 35 U.S.C. 154(b) by 254 days.

(21) Appl. No.: 10/670,103

(22) Filed: Sep. 23, 2003

(65) Prior Publication Data

US 2005/0062966 A1 Mar. 24, 2005

(51) Int. Cl.
*G01J 4/00* (2006.01)
(52) U.S. Cl. .................................................... 356/364
(58) Field of Classification Search .................. None
See application file for complete search history.

(56) References Cited

U.S. PATENT DOCUMENTS

| 4,671,660 A | | 6/1987 | Distl et al. | |
| 4,863,246 A | * | 9/1989 | Anthon | 359/487 |
| 5,363,235 A | | 11/1994 | Kiunke | |
| 5,781,293 A | | 7/1998 | Duncan | |
| 6,759,669 B1 | * | 7/2004 | Schmitz et al. | 250/559.29 |

FOREIGN PATENT DOCUMENTS

| EP | 0 601 873 A | 6/1994 |
| GB | 2 268 022 | 12/1993 |
| WO | WO 01/81949 A | 11/2001 |

OTHER PUBLICATIONS

Courtial J et al: "Design of a Static Fourier-Transform Spectrometer with Increased Field of View" Applied Optics, Optical Society of America, Washington, US, vol. 35, No. 34, Dec 1, 1996, pp. 6698-6702, XP000640855 ISSN: 0003-6935, * p. 6700, col. 2, line 15 - p. 6701, col. 1 line 27; figures 1.5* p. 6699, col. 1, lines 6,7.

* cited by examiner

*Primary Examiner*—Tu T. Nguyen
(74) *Attorney, Agent, or Firm*—John E. Gunther; Leonard A. Alkov; Karl A. Vick

(57) ABSTRACT

An imaging polarimeter sensor includes an achromatic beam-splitting polarizer that receives a polychromatic image beam of a scene and simultaneously produces a first polarized polychromatic image beam and a second polarized polychromatic image beam. The second polarized polychromatic image beam is of a different polarization than the first polarized polychromatic image beam and is angularly separated from the first polarized polychromatic image beam. The achromatic beam-splitting polarizer preferably includes a Wollaston prism through which the polychromatic image beam passes, and at least one grating through which the polychromatic image beam passes either before or after it passes through the Wollaston prism. An imaging detector receives the first polarized polychromatic image beam and the second polarized polychromatic image beam and produces an output image signal responsive to the first polarized polychromatic image beam and the second polarized polychromatic image beam.

16 Claims, 3 Drawing Sheets

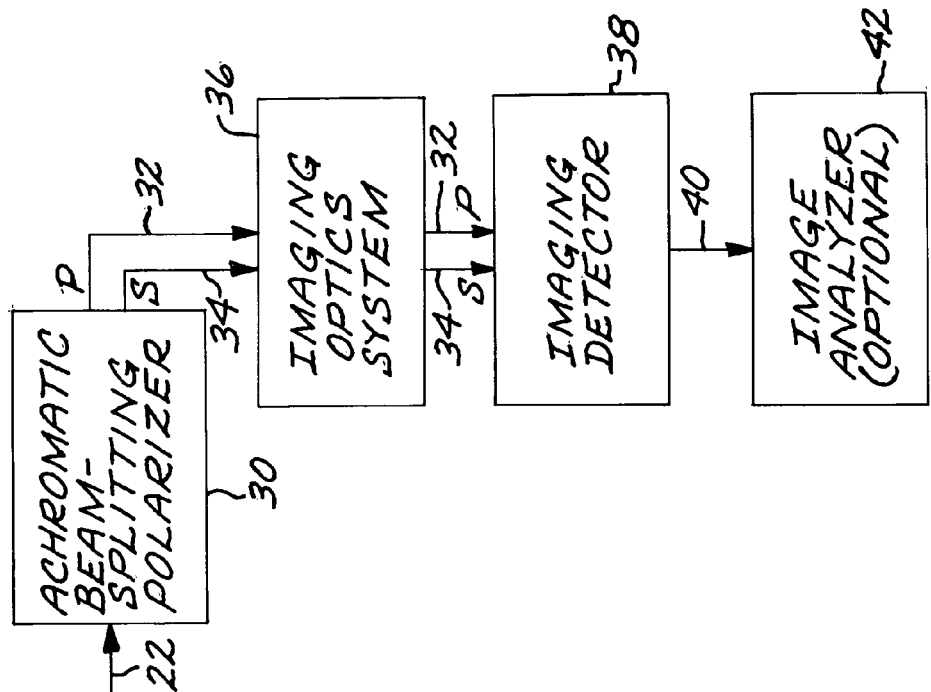
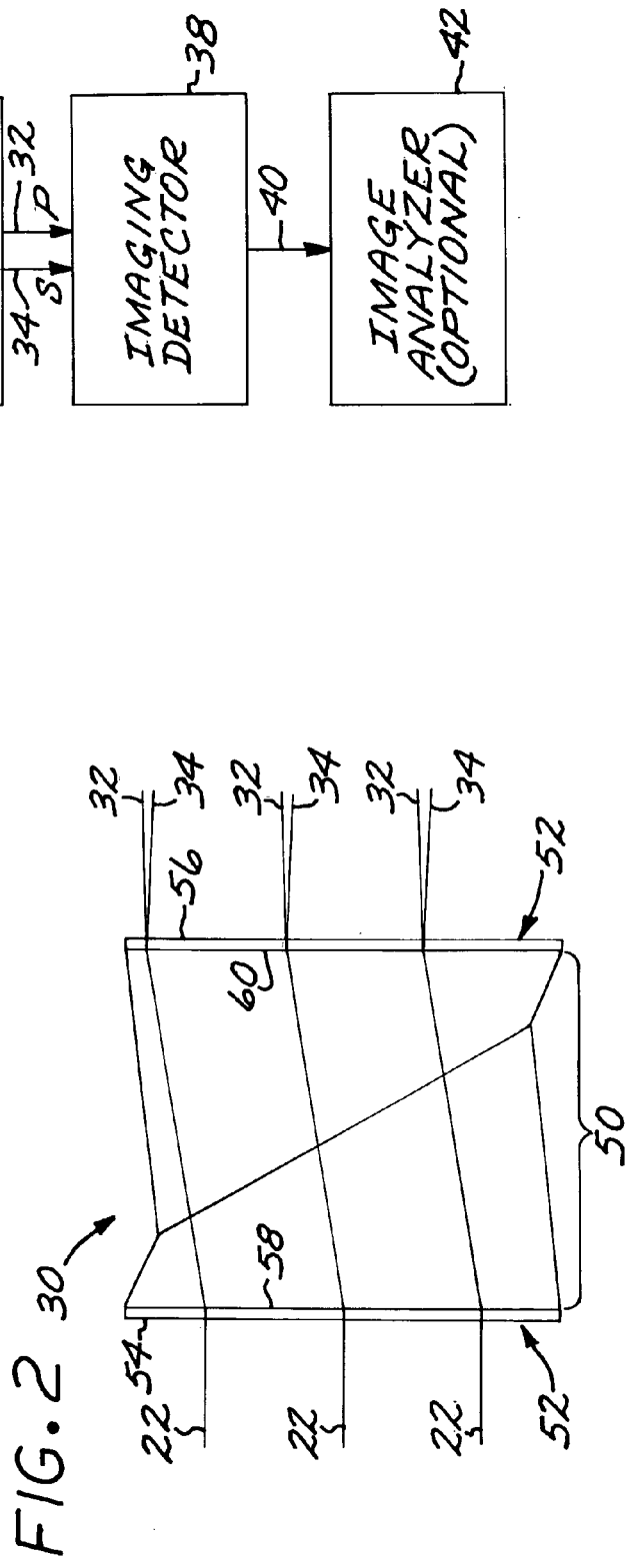
FIG. 1
FIG. 2

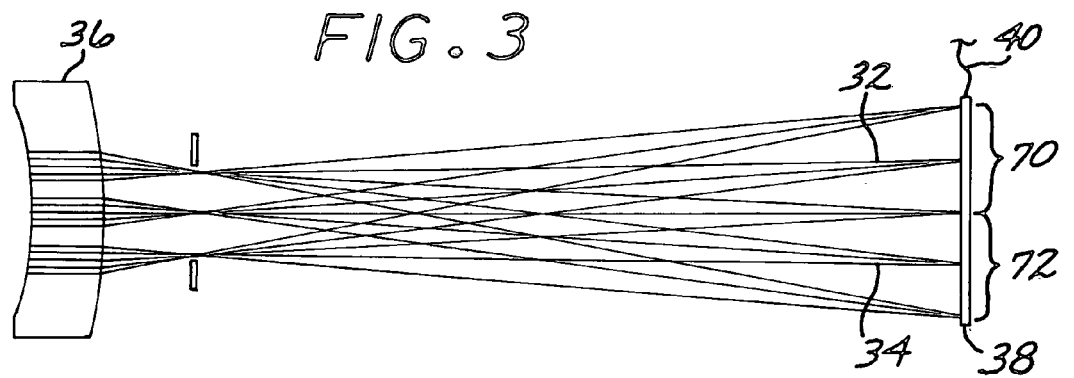
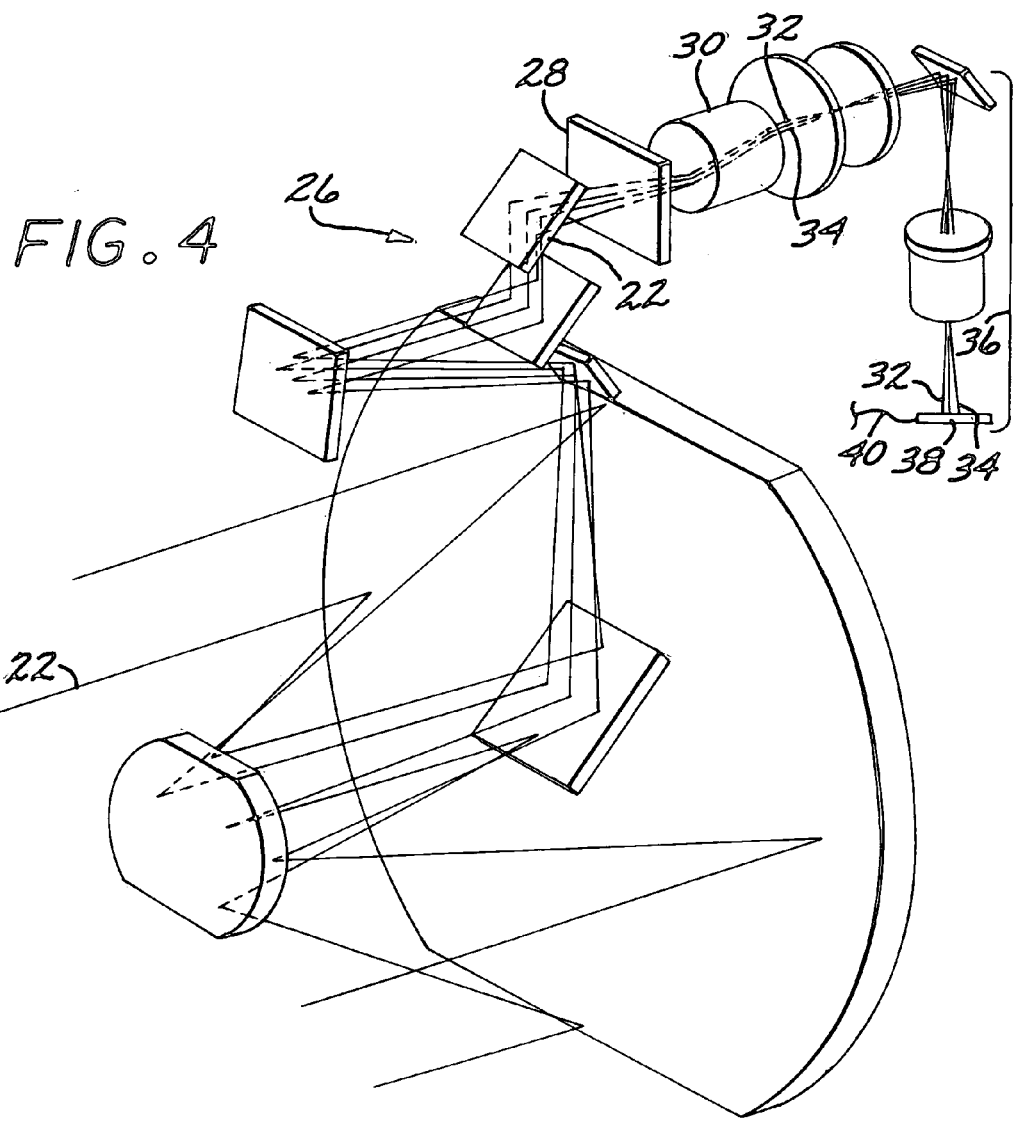

IMAGING POLARIMETER SENSOR WITH ACHROMATIC BEAM-SPLITTING POLARIZER

This invention relates to optical devices and, more particularly, to an imaging device that simultaneously produces and images two differently polarized images of the same scene.

BACKGROUND OF THE INVENTION

Imaging sensors form an image of a scene onto an imaging detector. The detector produces a responsive signal output, which is typically digitized and analyzed in digital form. Imaging sensors are widely used in military applications and increasingly in civilian applications.

The signal output of the imaging detector is automatically analyzed by a signal-processing computer for the presence of features of interest in the field of view of the sensor. The automated analysis of such images requires extensive computational power, because the field of view of the sensor may also include background clutter and other features, some of which may be similar to the features of interest. In military applications, the features of interest may be camouflaged to reduce their contrast with the background and to increase their similarity to other features in the field of view. Similar-appearing decoys may also be present.

One technique for improving the recognition of features of interest and reducing the computational power required is to perform analog image processing based upon image characteristics that aid in distinguishing features of interest. One specific type of analog image processing is a polarization analysis. Some features of interest may be identified from other features in the field of view by forming images of different polarization states of the features and then analyzing the differently polarized images. For example, many artificial features such as man-made objects exhibit differently polarized reflected light images, while natural features do not exhibit such differently polarized reflected light images.

The available polarizing imaging sensors utilize polarizers that form the differently polarized images sequentially. For example, a p-polarized image may be formed, and then the s-polarized image is formed shortly thereafter. This sequential polarization is necessary because the reflected light images in the scene are polychromatic. The available polarimeters that simultaneously form differently polarized images produce a chromatically aberrated image of each polarization state that is not useful for subsequent comparative analysis with the image of the other polarization state. The problem with using sequentially polarized images is that the features in the images may change position or shape slightly in the time required to form the sequential images. That is, the features may move relative to each other in the field of view or change aspect ratio even in the short time required to form the two differently polarized images. This relative movement in the p-polarized image and the s-polarized image greatly complicates or makes impossible the analysis of the digitized images by the imaging detector and the associated electronics. Another approach is to use two different detectors, with each detector simultaneously sensing a differently polarized image. This approach is excessively costly and adds too much weight and size for many applications.

There is therefore a need for an improved approach for producing and analyzing polarized images in an imaging polarizing sensor. The present invention fulfills this need, and further provides related advantages.

SUMMARY OF THE INVENTION

The present invention provides an imaging polarimeter sensor. Images of the scene in two different polarization states are formed simultaneously onto an imaging detector. The polarized polychromatic image beams are achromatic. That is, the image is similar to that seen by the human eye, in which all colors from the image are spatially superimposed over a wide spectral band. The image processing and optomechanical design of the sensor are thereby simplified, as compared with a case where the polarized image is not achromatic and the images formed by the various colors are spatially offset. The preferred form of the achromatic beam-splitting polarizer is compact and may be readily integrated into the remainder of the optical system of the sensor. The achromatic beam-splitting polarizer may be used in a sensor for which it is initially integrated, or it may be retrofitted into an existing non-polarizing sensor to create a polarizing sensor.

In accordance with the invention, an imaging polarimeter sensor comprises an achromatic beam-splitting polarizer that receives a polychromatic image beam (that is, having a range of wavelengths) of a scene and simultaneously produces a first polarized polychromatic image beam and a second polarized polychromatic image beam. The second polarized polychromatic image beam is of a different polarization than the first polarized polychromatic image beam and is angularly separated from the first polarized polychromatic image beam. An imaging detector receives the first polarized polychromatic image beam and the second polarized polychromatic image beam and produces an output image signal responsive to the first polarized polychromatic image beam and the second polarized polychromatic image beam. The first polarized polychromatic image beam and the second polarized polychromatic image beam may be spatially separated on the imaging detector, or they may be interlineated on the imaging detector.

The achromatic beam-splitting polarizer may include a Wollaston prism through which the polychromatic image beam passes, and at least one additional prism through which the polychromatic image beam passes either before or after it passes through the Wollaston prism. The achromatic beam-splitting polarizer may include a Wollaston prism through which the polychromatic image beam passes, and at least one grating through which the polychromatic image beam passes either before or after it passes through the Wollaston prism.

The achromatic beam-splitting polarizer may include a Wollaston prism through which the polychromatic image beam passes, and at least one blazed grating through which the polychromatic image beam passes either before or after it passes through the Wollaston prism. The achromatic beam-splitting polarizer may include a Wollaston prism through which the polychromatic image beam passes, a first grating through which the polychromatic image beam passes before it passes through the Wollaston prism, and a second grating through which the polychromatic image beam passes after it passes through the Wollaston prism. Preferably, the gratings, where used, are blazed gratings.

The imaging polarimeter sensor typically also includes an imaging optics system that images the first polarized polychromatic image beam and the second polarized polychromatic image beam onto the imaging detector. It may also include an objective such as a telescope that receives the polychromatic image beam (prior to polarization) and directs it into the achromatic beam-splitting polarizer. A half-wavelength plate, through which the polychromatic image beam passes before it passes through the achromatic beam-splitting polarizer, may be selectively or permanently inserted into the polychromatic image beam.

A Wollaston prism is a beam-splitting polarizer. An input beam is split into two polarized output beams, each of which is differently polarized. The angle between the polarized output beams is a function of the wavelength of the input beam and the prism angle. A Wollaston prism (or other type of polarizing prism), when used by itself, is therefore essentially restricted to single wavelengths or, at most, a narrow wavelength band when used in imaging applications. However, when used in conjunction with at least one additional prism, which is preferably at least one grating, the combination produces two polarized output beams where the angle between the polarized output beams is not dependent (or is weakly dependent) upon the wavelength of the input beam. The input beam may therefore be a wide-band beam, with a broad spectral band that is found in most scene images and is required for most practical image analysis applications. The wide-band beam is divided into two wide-band polarized output beams that are of different polarizations and are angularly (and thus spatially) offset from each other. These two wide-band polarized output beams are imaged onto two imaging detectors, or onto two regions of a single imaging detector. The two wide-band polarized output beams are available for analysis to characterize the nature of the features of the scene according to their polarizations, or for other purposes.

The achromatic beam-splitting polarizer of the present approach is simple in construction, compact in size, and light in weight. It may be part of a new imaging polarimeter sensor. It may instead be added into and integrated with an existing non-polarizing imaging sensor, to convert the existing non-polarizing imaging sensor into an imaging polarimeter sensor. Desirably, the achromatic beam-splitting polarizer is placed near to a pupil location in the optical system—an entrance pupil, an exit pupil, or an intermediate pupil—so that its size may be small.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a block diagram of an imaging polarimeter sensor;

FIG. 2 is an optical schematic drawing of an achromatic beam-splitting polarizer;

FIG. 3 is an optical schematic drawing of a first embodiment of the imaging of the two polarized polychromatic image beams produced by the achromatic beam-splitting polarizer;

FIG. 4 is a optical schematic perspective view of one form of an imaging polarimeter sensor.

DETAILED DESCRIPTION OF THE INVENTION

Figure 5:
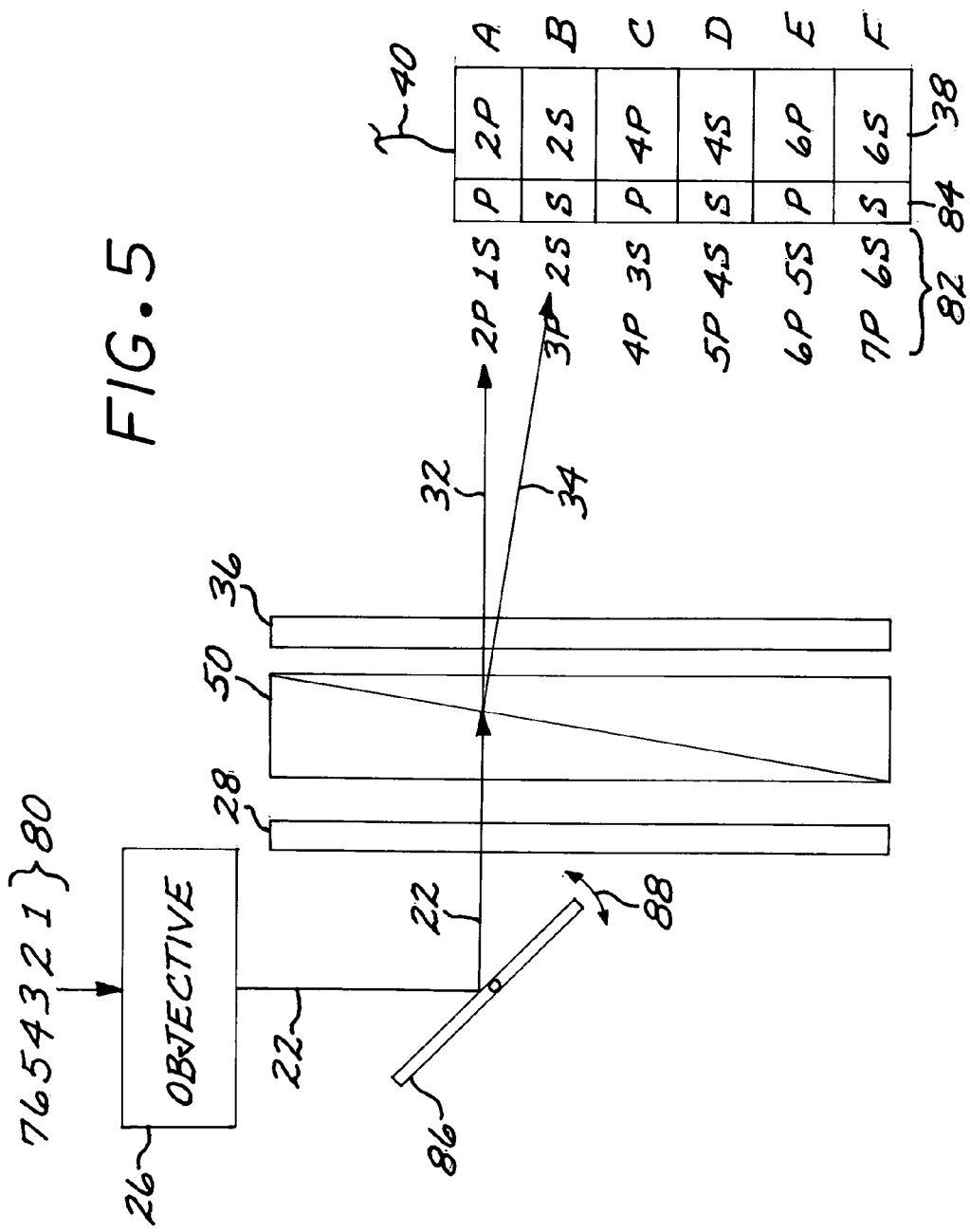
FIG. 5 is an optical schematic drawing of a second embodiment of the imaging of the two polarized polychromatic image beams produced by the achromatic beam-splitting polarizer.

FIG. 1 depicts an imaging polarimeter sensor 20 in block diagram form. The imaging polarimeter sensor 20 receives a polychromatic image beam 22 from a scene 24. "Polychromatic" as used here means that the image beam, whether unpolarized or polarized, has a range of wavelengths, and is not monochromatic. The light of the polychromatic image beam 22 is preferably and typically broad-band visible or infrared light. That is, the polychromatic image beam 22 has light of a broad range of wavelengths, and is not monochromatic.

An objective 26 of the imaging polarimeter sensor 20 gathers the energy of the polychromatic image beam 22, collimates the polychromatic image beam 22, and directs the polychromatic image beam 22 through an optional half-wavelength plate 28 and into an achromatic beam-splitting polarizer 30. The objective 26 is preferably a telescope that provides its output polychromatic image beam 22 of suitable magnification for subsequent processing. The achromatic beam-splitting polarizer 30 receives the polychromatic image beam 22 and splits the polychromatic image beam 22 into a first polarized polychromatic image beam 32 (here depicted as a p-polarized beam) and a second polarized polychromatic image beam 34 (here depicted as an s-polarized polychromatic image beam). The second polarized polychromatic image beam 34 is of a different polarization than the first polarized polychromatic image beam 32 and is angularly offset and separated from the first polarized polychromatic image beam 32. The first polarized polychromatic image beam 32 and the second polarized polychromatic image beam 34 are of the same scene and are derived from the same polychromatic image beam 22, but are of different polarization states. The first polarized polychromatic image beam 32 and the second polarized polychromatic image beam 34 are formed simultaneously without any time delay between them, and are of precisely the same scene taken at the same moment in time. The angular separation of the polarized polychromatic image beams 32 and 34 is typically achieved by an angular divergence of the two polarized polychromatic image beams 32 and 34 as they leave the achromatic beam-splitting polarizer 30.

An imaging optics system 36 images the two polarized polychromatic image beams 32 and 34 onto an imaging detector 38, which is preferably a focal plane array (FPA) detector. The imaging detector 38 produces an output image signal 40 responsive to the first polarized polychromatic image beam 32 and the second polarized polychromatic image beam 34. The output image signal 40 is preferably provided to an optional image analyzer 42, which comprises a specialized computer to analyze the output image signal 40.

The objective 26, imaging optics system 36, imaging detector 38, and image analyzer 40 are all components known in the art for other applications. See for example, U.S. Pat. No. 5,363,235, whose disclosure is incorporated by reference.

FIG. 2 schematically illustrates a preferred embodiment of the achromatic beam-splitting polarizer 30 in greater detail. The achromatic beam-splitting polarizer 30 preferably includes a Wollaston (sometimes spelled Wallaston in the technical literature) prism 50. The Wollaston prism 50 is a known, commercially available device that functions as a polarizing beam splitter. The input beam, here the polychromatic image beam 22, is split into two output beams, here the first polarized polychromatic image beam 32 and the second polarized polychromatic image beam 34 of differing polarizations. The first polarized polychromatic image beam 32 and the second polarized polychromatic image beam 34 are angularly separated from each other by being slightly angularly deviated from each other as they leave the Wollaston prism.

An additional prism 52 must be placed in the polychromatic image beam 22 or the polarized polychromatic image beams 32/34, or both. Preferably, the additional prism 52 is a diffraction grating 54 and/or 56. That is, there may be one diffraction grating 54 on the input side of the Wollaston prism 50, one diffraction grating 56 on the output side of the Wollaston prism 50, or both of the diffraction gratings 54 and 56 may be used. Most preferably, the additional prism 52 is a blazed diffraction grating 54 and/or 56 that increases the optical efficiency of the imaging polarimeter sensor 20 by allowing selection of the diffraction order and channeling a maximum amount of energy into the selected diffraction order and thence into the polarized polychromatic image beams 32 and 34. The blazed grating 54 and/or 56 is characterized by asymmetric grooves with respect to the surface normal of the grating substrate. The use of a conventional or a blazed diffraction grating 54 and/or 56 is preferred to other types of additional prisms 52 because the diffraction gratings 54 and 56 are thin and light in weight. The gratings 54 and 56 may be formed separately and attached to the respective input face 58 or output face 60 of the Wollaston prism 50. The gratings 54 and 56 may instead be formed directly in the respective input face 58 or output face 60 of the Wollaston prism 50. The grating vector, which is perpendicular to the grating line in the plane of the grating lines, is in the same orientation as the beam deviation of the Wollaston prism 50

The additional prism 52, specifically the gratings 54 and/or 56, is necessary because the deviation angle of the output beams of a conventional Wollaston prism, used by itself, is a function of the wavelength of the light in the input beam (as well as the geometry of the Wollaston prism and the selection of its optically active materials of construction). The conventional Wollaston prism is therefore useful, when used by itself, only for monochromatic or nearly monochromatic light in general imaging applications. The additional prism 52 pre-diffracts the entering polychromatic image beam 22 or post-diffracts the exiting polarized polychromatic image beams 32/34 (or both) to compensate for this wavelength dependence of the angle of the polarized output beams. The compensation is also wavelength dependent but in the opposite direction. The net result is that the deviation angle of the exiting polarized polychromatic image beams 32/34 is no longer a function of wavelength (or at worst very weakly a function of wavelength). The polychromatic image beam 22 may therefore be polychromatic over a wide wavelength range, and all of the respective polarized output rays corresponding to the various wavelengths will be coincident for the two respective polarizations of the polarized polychromatic image beams 32 and 34.

The half-wavelength plate 28 may also be furnished and positioned so that the polychromatic image beam 22 passes through the half-wavelength plate 28 before it passes through the achromatic beam-splitting polarizer 30. The half-wavelength plate 28, when present to intercept the polychromatic image beam 22, provides additional polarization information. For example, if a first measurement is made with the half-wavelength plate 28 at a first orientation, and the half-wavelength plate 28 is clocked 22.5 degrees for a second measurement, additional +45 and −45 degree polarization state information is made available.

FIG. 3 illustrates the manner in which the first polarized polychromatic image beam 32 and the second polarized polychromatic image beam 34 are incident upon the imaging detector 38 in a first embodiment. The angular separation between the first polarized polychromatic image beam 32 and the second polarized polychromatic image beam 34 produces a spatial separation at the imaging detector 38. A first portion 70 of the imaging detector 38 senses the entire first polarized polychromatic image beam 32, and a second, spatially separated, portion 72 of the imaging detector 38 senses the entire second polarized polychromatic image beam 32. The imaging detector 38 thereby senses the two polarized polychromatic image beams 32 and 34 simultaneously, for providing the output image signal 40 to the image analyzer 42. The approach of FIG. 3 may instead be implemented with two separate imaging detectors for the portions 70 and 72.

FIG. 1 depicts the imaging polarimeter 20 in a block diagram form. FIG. 4 shows a physical layout of a practical embodiment of the imaging polarimeter 20. The objective 26 is a telescope, and the half-wavelength plate 28 is illustrated as present.

FIG. 3 depicts the imaging of the entire first polychromatic polarized image beam 32 (the p-polarized beam in the example) on the first portion 70 of the imaging detector 38, and the imaging of the entire second polychromatic polarized image beam 34 (the s-polarized beam in the example) on the second, spatially separated, portion 72 of the imaging detector 38. This approach of FIG. 3 is fully operable, but may have limitations in some applications. Specifically, if there is any significant field-dependent aberration in the imaging optics system 36, the images of the two polarized image beams 32 and 34 may have sufficiently different distortions so that they cannot be readily registered by the image analyzer 42 for analytical purposes.

FIG. 5 schematically illustrates a second embodiment of an imaging approach that largely avoids this limitation. In this case, the Wollaston prism 50 is constructed to produce a very small angular displacement between the first polarized polychromatic image beam 32 and the second polarized polychromatic image beam 34 at the detector 38. The spatial separation between the first polarized polychromatic image beam 32 and the second polarized polychromatic image beam 34 at the detector 38 is selected to be equal to one pixel dimension on the detector 38, or about 40 micrometers in a typical case. For an array of target pixels 80 in the scene 24, numbered 1–7 in the example of FIG. 5, the Wollaston prism 50 produces an array 82 of the polychromatic image beams 32 and 34 at the detector 38. The 2P and 2S (where the "2" indicates the pixel number in the array of target pixels 80, and "P" and "S" indicate the polarization states) pixels are separated by one pixel dimension at the detector 38. A micropolarizer 84 with alternating polarization lines is placed over the face of the detector 38. The micropolarizer 84 is preferably a set of etched grid lines on the face of the detector 38, as is known in the art for other purposes. Only the properly polarized polychromatic image beam 32 or 34 passes through the micropolarizer 84 to reach the detector 38.

The result is as shown in FIG. 5, with the 2P pixel of the scene 24 imaged at pixel location A of the detector 38, the 2S pixel of the scene 24 imaged at pixel location B of the detector 38, the 4P pixel of the scene 24 imaged at pixel location C of the detector 38, the 4S pixel of the scene 24 imaged at pixel location D of the detector 38, and so on. Each of the pixels in FIG. 5 represents a line of pixels extending out of the plane of the page. This interspersing of the pixel lines 1–7 of the scene 24 on the detector 38 is termed "interlineation". The first polarized polychromatic image beam 32 is thus interlineated with the second polarized polychromatic image beam 34 on the imaging detector 38 on a pixel line-by-pixel line of the scene basis. That is, the respective P-polarized and S-polarized components of each pixel of the image are simultaneously imaged immediately next to each other, separated by only one pixel width on the detector 38, or about 40 micrometers in conventional current detector technology. (The interlineation could be more than one pixel, if desired, such as pairs of pixels, etc., but not so as to achieve a complete spatial separation of the two polarized polychromatic image beams in this embodiment) In this embodiment, the first polarized polychromatic image beam and the second polarized polychromatic image beam are not imaged onto two portions of the imaging detector that are spatially separated from each other, as in the embodiment of FIG. 3.

As shown, this approach simultaneously images only the even-numbered P and S polarization states. The odd-numbered P and S polarization states may be imaged by changing the angle of the polychromatic image beam 22 by the dimension of one pixel on the detector 38. A mirror 86, preferably a fast-steering mirror such as used in an image motion compensator, is positioned to change the angle by a sufficient rotation 88 that the odd numbered pixels from the scene 24 will be shifted by one pixel spacing on the micropolarizer 84 and thence passed through the micropolarizer 84 to produce simultaneously the 1P-1S, 3P-3S, and so on instantaneous image pairings comparable to the 2P-2S, 4P-4S, and so on instantaneous image pairings illustrated in FIG. 5. With this approach, the paired S and P pixels are separated by only one pixel, so that any aberrations in the imaging optics system 36 will affect the paired S and P pixels in a similar manner, allowing them to be properly registered, imaged by the detector 38, and then analyzed by the image analyzer 42. This approach produces an interleaved image comparable to that of a conventional television monitor.

The present approach as depicted in FIGS. 1 and 4 has been reduced to practice with a computer simulation, using the structure discussed above. A result such as shown in FIG. 3 was obtained for a polychromatic image beam 22.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An imaging polarimeter sensor, comprising:
    an achromatic beam-splitting polarizer that receives a polychromatic image beam of a scene and simultaneously produces a first polarized polychromatic image beam and a second polarized polychromatic image beam, wherein the second polarized polychromatic image beam is of a different polarization than the first polarized polychromatic image beam and is angularly separated from the first polarized polychromatic image beam;
    an imaging detector that receives the first polarized polychromatic image beam and the second polarized polychromatic image beam and produces an output image signal of the scene responsive to the first polarized polychromatic image beam and the second polarized polychromatic image beam; and
    an imaging optics system that images the first polarized polychromatic image beam and the second polarized polychromatic image beam onto the imaging detector.

2. The imaging polarimeter sensor of claim 1, wherein the achromatic beam-splitting polarizer comprises
    a Wollaston prism through which the polychromatic image beam passes, and
    at least one additional prism through which the polychromatic image beam passes either before or after it passes through the Wollaston prism.

3. The imaging polarimeter sensor of claim 1, wherein the achromatic beam-splitting polarizer comprises
    a Wollaston prism through which the polychromatic image beam passes, and
    at least one grating through which the polychromatic image beam passes either before or after it passes through the Wollaston prism.

4. The imaging polarimeter sensor of claim 1, wherein the achromatic beam-splitting polarizer comprises
    a Wollaston prism through which the polychromatic image beam passes, and
    at least one blazed grating through which the polychromatic image beam passes either before or after it passes through the Wollaston prism.

5. The imaging polarimeter sensor of claim 1, wherein the achromatic beam-splitting polarizer comprises
    a Wollaston prism through which the polychromatic image beam passes,
    a first grating through which the polychromatic image beam passes before it passes through the Wollaston prism, and
    a second grating through which the polychromatic image beam passes after it passes through the Wollaston prism.

6. The imaging polarimeter sensor of claim 1, wherein the achromatic beam-splitting polarizer comprises
    a Wollaston prism through which the polychromatic image beam passes,
    a first blazed grating through which the polychromatic image beam passes before it passes through the Wollaston prism, and
    a second blazed grating through which the polychromatic image beam passes after it passes through the Wollaston prism.

7. The imaging polarimeter sensor of claim 1, further including
    a half-wavelength plate through which the polychromatic image beam passes before it passes through the achromatic beam-splitting polarizer.

8. The imaging polarimeter sensor of claim 1, further including
    a telescope that receives the polychromatic image beam and directs it into the achromatic beam-splitting polarizer.

9. The imaging polarimeter sensor of claim 1, wherein the first polarized polychromatic image beam is imaged onto a first portion of the imaging detector, and the second polarized polychromatic image beam is imaged onto a second portion of the imaging detector spatially separated from the first portion of the imaging detector.

10. The imaging polarimeter sensor of claim 1, wherein the first polarized polychromatic image beam and the second polarized polychromatic image beam are interlineated on the imaging detector.

11. The imaging polarimeter sensor of claim 1, further including
    an objective that receives the polychromatic image beam from the scene and directs it into the achromatic beam-splitting polarizer.

12. An imaging polarimeter sensor, comprising:
    an achromatic beam-splitting polarizer through which a polychromatic image beam from a scene passes, wherein the achromatic beam-splitting polarizer simultaneously produces a first polarized polychromatic image beam and a second polarized polychromatic image beam, and wherein the second polarized polychromatic image beam is of a different polarization than the first polarized polychromatic image beam and is angularly separated from the first polarized polychromatic image beam, wherein the achromatic beam-splitting polarizer comprises a Wollaston prism, and at least one grating through which the polychromatic image beam passes either before or after it passes through the Wollaston prism;

an imaging detector that receives the first polarized polychromatic image beam and the second polarized polychromatic image beam and produces an output image signal responsive to the first polarized polychromatic image beam and to the second polarized polychromatic image beam; and an imaging optics system that images the first polarized polychromatic image beam and the second polarized polychromatic image beam onto the imaging detector.

13. The imaging polarimeter sensor of claim 12, further including a half-wavelength plate through which the polychromatic image beam passes before it passes through the achromatic beam-splitting polarizer.

14. The imaging polarimeter sensor of claim 12, further including an objective that receives the polychromatic image beam and directs it into the achromatic beam-splitting polarizer.

15. The imaging polarimeter sensor of claim 12, wherein the first polarized polychromatic image beam is imaged onto a first portion of the imaging detector, and the second polarized polychromatic image beam is imaged onto a second portion of the imaging detector spatially separated from the first portion of the imaging detector.

16. The imaging polarimeter sensor of claim 12, wherein the first polarized polychromatic image beam and the second polarized polychromatic image beam are interlineated on the imaging detector.

* * * * *